US012574455B2

(12) United States Patent
Honda et al.

(10) Patent No.: US 12,574,455 B2
(45) Date of Patent: Mar. 10, 2026

(54) NOTIFICATION CONTROL APPARATUS AND METHOD

(71) Applicant: HONDA MOTOR CO., LTD., Tokyo (JP)

(72) Inventors: Eiji Honda, Tokyo (JP); Genta Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 449 days.

(21) Appl. No.: 18/167,098

(22) Filed: Feb. 10, 2023

(65) Prior Publication Data

US 2023/0300233 A1     Sep. 21, 2023

(30) Foreign Application Priority Data

Mar. 17, 2022     (JP) ................................. 2022-042982

(51) Int. Cl.
| *H04M 1/72409* | (2021.01) |
| *G06F 8/65* | (2018.01) |
| *H04W 4/02* | (2018.01) |
| *H04W 68/00* | (2009.01) |

(52) U.S. Cl.
CPC ........ *H04M 1/724098* (2022.02); *G06F 8/65* (2013.01); *H04W 4/023* (2013.01); *H04W 68/005* (2013.01)

(58) Field of Classification Search
CPC ....... H04M 1/724098; H04M 1/72412; H04M 1/72454; G06F 8/65; H04W 4/023;
H04W 68/005; H04W 4/021; H04W 4/12;
H04W 8/245; H04W 4/44
See application file for complete search history.

(56) References Cited

U.S. PATENT DOCUMENTS

| 11,736,577 B2 * | 8/2023 | Nagamitsu | .............. H04L 67/60 |
| | | | 709/203 |
| 11,740,889 B2 * | 8/2023 | Fukuyo | ................... H04L 67/34 |
| | | | 717/173 |
| 11,755,308 B2 * | 9/2023 | Takatsuna | ................. G06F 8/65 |
| | | | 717/173 |
| 12,074,952 B2 * | 8/2024 | Satoh | .................... G06F 21/445 |
| 2012/0323402 A1 * | 12/2012 | Murakami | ............. G07C 5/008 |
| | | | 701/1 |

(Continued)

FOREIGN PATENT DOCUMENTS

JP            2021043734 A        3/2021

*Primary Examiner* — Dhaval V Patel

(57)            ABSTRACT

A notification control apparatus, including: a distance obtaining unit for obtaining a distance between a vehicle and a mobile terminal associated with the vehicle; and a controlling unit for outputting to the mobile terminal, based on a distance obtained by the distance obtaining unit, notification regarding software update of the vehicle. The controlling unit is configured to: output to the mobile terminal, if the distance obtained by the distance obtaining unit is a first distance or more, a first notification for confirming whether to perform the software update with a user; and change a mode of a second notification regarding the software update for the mobile terminal, based on whether the distance obtained by the distance obtaining unit is the first distance or more when execution of the software update is instructed in response to the first notification.

11 Claims, 9 Drawing Sheets

(56)         References Cited

U.S. PATENT DOCUMENTS

2015/0363188 A1 *  12/2015  Tsuchiya ................... G06F 8/65
                                                717/173
2022/0012039 A1 *   1/2022  Fukuyo ................... H04L 67/34

* cited by examiner

NOTIFICATION CONTROL APPARATUS AND METHOD

The contents of the following Japanese patent application(s) are incorporated herein by reference:
NO. 2022-042982 filed on Mar. 17, 2022.

BACKGROUND

1. Technical Field

The present invention relates to a notification control apparatus and a method.

2. Related Art

In recent years, there has been an active effort to provide access to a sustainable transportation system with consideration given to even vulnerable people among traffic participants. To achieve this, research and development have been focused on further improving traffic safety and traffic convenience through research and development related to preventive safety techniques. Patent Document 1 describes about a system for detecting a distance between a vehicle and a user, and determining whether an update can be performed by using the distance between the vehicle and the user.

PRIOR ART DOCUMENT

Patent Document 1: Japanese Patent Application Publication No. 2021-43734

SUMMARY

DESCRIPTION OF EXEMPLARY EMBODIMENTS

Hereinafter, embodiments of the present invention will be described. However, the following embodiments are not for limiting the invention according to the claims. In addition, some combinations of features described in the embodiments may not be essential for the solving means of the invention.

Figure 1:
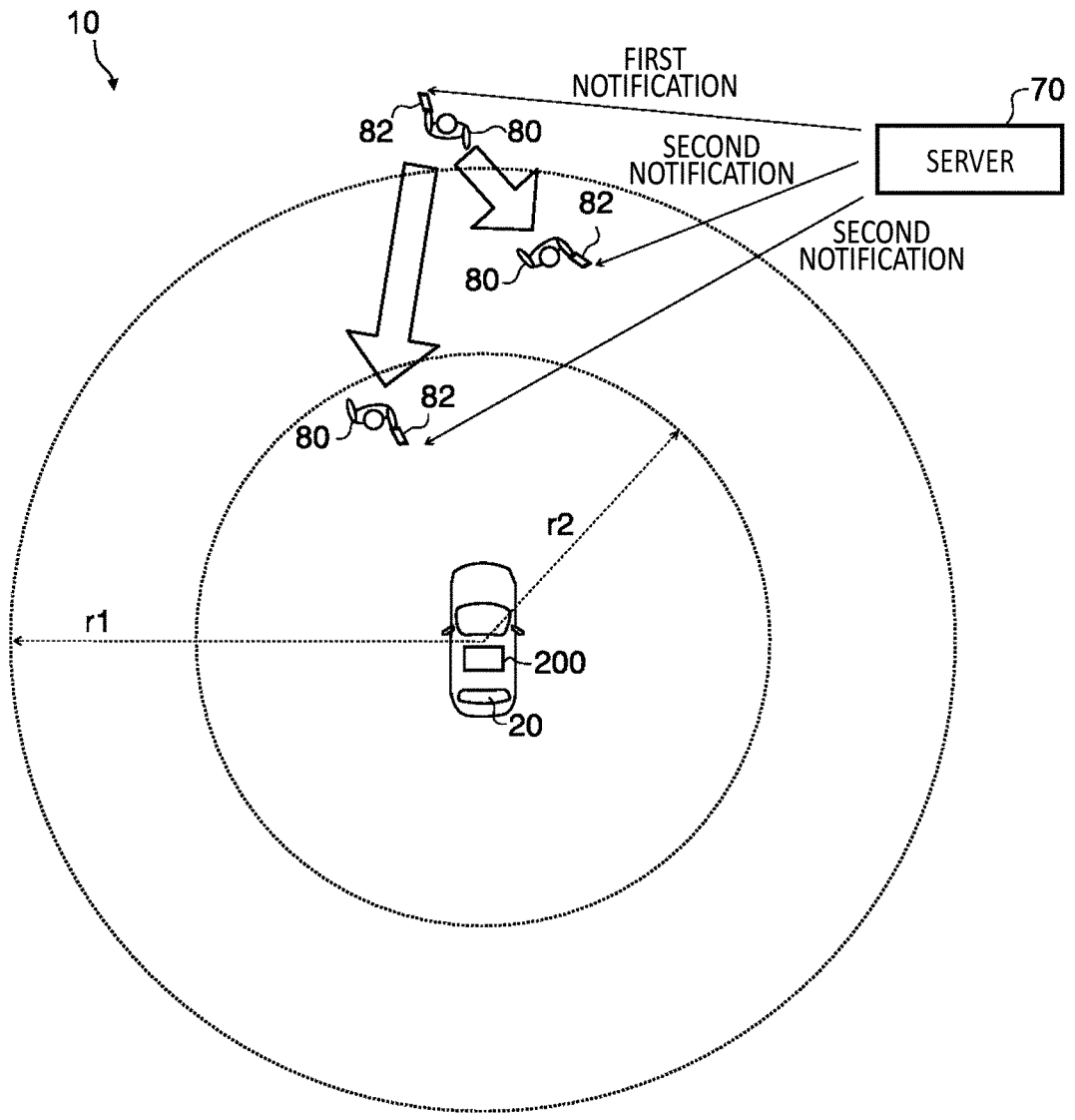
FIG. 1 schematically shows an updating system 10 according to one embodiment.

FIG. 1 schematically shows an updating system 10 according to one embodiment. The updating system 10 includes a vehicle 20, a server 70, and a mobile terminal 82.

The mobile terminal 82 is associated with a user 80 who is a user of the vehicle 20. The mobile terminal 82 may be a mobile communication terminal having a data communication function, such as a smartphone.

The vehicle 20 includes a control system 200. The control system 200 controls the vehicle 20, and performs communication with the server 70 via a public communication network including a mobile communication network etc.

In the vehicle 20, the control system 200 includes a plurality of Electronic Control Units (ECUs) for controlling the vehicle 20. The server 70 performs control related to reprogramming of the ECUs included in the control system 200. For example, the server 70 transmits update software to the control system 200 via the public communication network, and the control system 200 receives the update software transmitted via the public communication network by means of wireless communication. The control system 200 rewrites software for controlling the ECUs, which are included in the control system 200, into the update software and thereby performs reprogramming of the ECUs. The reprogramming is performed for a purpose of upgrading functions of the ECUs included in the control system 200, and the like. In this way, the control system 200 updates the software of the ECUs by using Over-The-Air (OTA), and thereby reprograms the ECUs. In the present embodiment, a term "software update" refers to rewriting software of equipment such as an ECU into update software.

Here, it is assumed that there is update software for the control system 200 of the vehicle 20. Further, it is assumed that after the user 80 got off the vehicle 20, the user 80 has reached a location away from the vehicle 20 by a distance r1 or more. Once the server 70 determines that the mobile terminal 82 has reached a location away from the vehicle 20 by the distance r1 or more, based on current location information of the mobile terminal 82 and location information of when the vehicle 20 stopped, the server 70 transmits a first notification indicating that there is update software for the vehicle 20 to the mobile device 82.

Then, the user 80 notices the first notification received by the mobile terminal 82, and performs a response operation in response to the first notification received by the mobile terminal 82, and thereby instructs execution of software update of the control system 200. Once the user 80 instructs the execution of the software update, the server 70 calculates, based on location information of the mobile terminal 82 when the user 80 instructed the software update, and location information of when the vehicle 20 stopped, a distance between the mobile terminal 82 and the vehicle 20 when the user 80 instructed the software update. Herein, the distance between the mobile terminal 82 and the vehicle 20 when the user 80 instructed the software update is abbreviated as a "terminal-vehicle distance at the time of the notification response".

Depending on the terminal-vehicle distance at the time of the notification response, the server 70 determines a mode of an additional second notification for the mobile terminal 82. By way of example, if the terminal-vehicle distance at the time of the notification response is r1 or more, the server 70 causes the control system 200 to execute the software update without performing the second notification to the mobile terminal 82. If the terminal-vehicle distance at the time of the notification response is r2 or more and less than r1, the server 70 transmits a message such as "The software update may not be completed if you return to the vehicle from now on", or "Use of the vehicle will be restricted for about five minutes from now on" as the second notification, and causes the control system 200 to execute the software update. If the terminal-vehicle distance at the time of the notification response is less than r2, the server 70 transmits a notification message of "The software update could not be performed because an updating condition is not satisfied" as the second notification, and does not cause the control system 200 to execute the software update. Alternatively, if the terminal-vehicle distance at the time of the notification response is less than r2, the server 70 may cause an approval request message of "Use of the vehicle will be restricted for about five minutes from now on. Are you sure to execute the software update?" to be transmitted as the second notification, and cause the control system 200 to execute the software update after obtaining approval for the software update from the user 80.

In this way, according to the updating system 10, after notifying the mobile terminal 82 and depending on the distance between the mobile terminal 82 and the vehicle 20 when the user 80 responded to the notification regarding the software update, it is possible to change the mode of the second notification for the user 80. Thereby, it is possible to appropriately notify depending on the location of the user 80 when the user 80 instructed to perform the software update, e.g., further notifying of possibility of restriction on use of the vehicle 20. Accordingly, it is possible to prevent the user 80 from experiencing such a situation in which the user 80 cannot immediately use the vehicle 20 because the software update of the control system 200 is being performed when the user 80 returns to the location of the vehicle 20.

Figure 2:
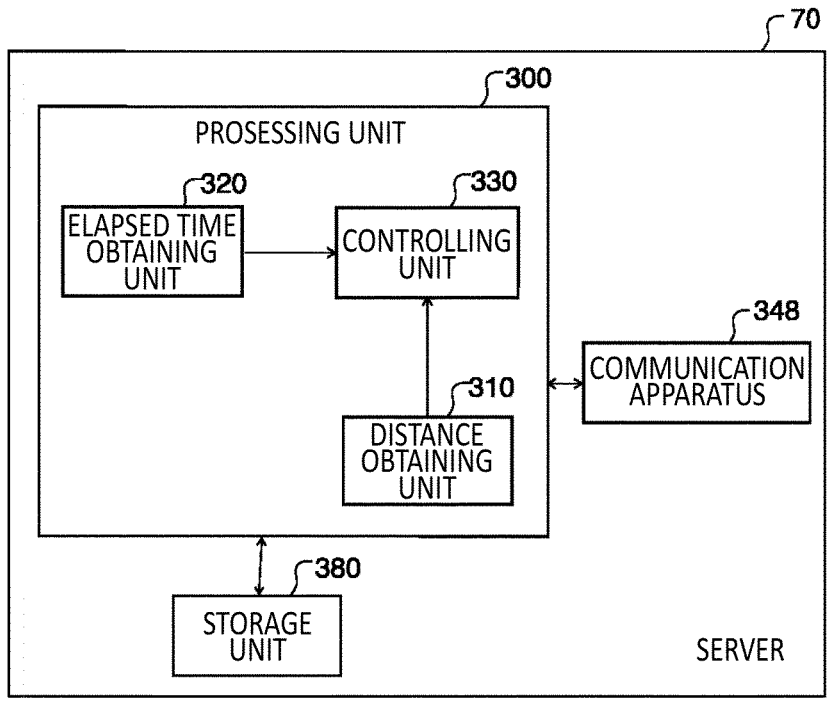
FIG. 2 shows a system configuration of a server 70.

FIG. 2 shows a system configuration of the server 70. The server 70 includes a communication apparatus 348, a processing unit 300, and a storage unit 380.

The processing unit 300 controls the communication apparatus 348. The communication apparatus 348 performs communication between the mobile terminal 82 and the control system 200. The processing unit 300 is embodied in a circuit of an arithmetic processing unit etc. including a processor, for example. The storage unit 380 is embodied including a non-volatile storage medium. The processing unit 300 uses information stored in the storage unit 380 for processing. The processing unit 300 may be embodied in a microcomputer including a CPU, ROM, RAM, I/O, bus, and the like.

The processing unit 300 includes a controlling unit 330, an elapsed time obtaining unit 320, and a distance obtaining unit 310. Note that, an embodiment may be adopted in which a processing unit 300 does not have a part of the functions of the functional blocks shown in FIG. 2.

The distance obtaining unit 310 obtains a distance between a vehicle 20 and a mobile terminal 82 associated with the vehicle 20. The controlling unit 330 outputs to the mobile terminal 82, based on the distance obtained by the distance obtaining unit 310, notification regarding software update of the vehicle 20. Specifically, the controlling unit 330 outputs to the mobile terminal 82, if the distance obtained by the distance obtaining unit 310 is a first distance or more, a first notification for confirming whether to perform the software update with the user 80. The controlling unit 330 changes a mode of a second notification regarding the software update for the mobile terminal 82, based on whether the distance obtained by the distance obtaining unit 310 is the first distance or more when execution of the software update is instructed in response to the first notification.

If the distance obtained by the distance obtaining unit 310 is shorter than the first distance and equal to or more than a second distance that is shorter than the first distance when execution of the software update is instructed in response to the first notification, the controlling unit 330 outputs the second notification for the mobile terminal 82, and also performs control for transmitting a signal for instructing the vehicle 20 to perform the software update. The first distance and the second distance may be distances set for every user 80.

The controlling unit 330 outputs the second notification for the mobile terminal 82, if a distance obtained by the distance obtaining unit 310 is shorter than the second distance when execution of the software update is instructed in response to the first notification. The second notification indicates the software update.

The elapsed time obtaining unit 320 obtains elapsed time after the user 80 of the vehicle 20 gets out of the vehicle 20. The controlling unit 330 outputs to the mobile terminal 82, based on the distance obtained by the distance obtaining unit 310 or the elapsed time obtained by elapsed time obtaining unit 320, notification regarding the software update of the vehicle 20. Specifically, the controlling unit 330 outputs to the mobile terminal 82, if the elapsed time obtained by the elapsed time obtaining unit 320 becomes a first time or more, a first notification for confirming whether to perform the software update. The controlling unit 330 outputs the first notification again if the distance obtained by the distance obtaining unit 310 becomes the first distance or more after outputting the first notification. The first time may be set for every user 80.

The controlling unit 330 outputs the first notification if the distance obtained by the distance obtaining unit 310 becomes the first distance or more before the elapsed time obtained by the elapsed time obtaining unit 320 becomes the first time or more. The controlling unit 330 restrains the output of the first notification if the elapsed time obtained by the elapsed time obtaining unit 320 becomes the first time or more after outputting the first notification when the distance obtained by the distance obtaining unit 310 becomes the first distance or more before the elapsed time obtained by the elapsed time obtaining unit 320 becomes the first time or more.

Figure 3:
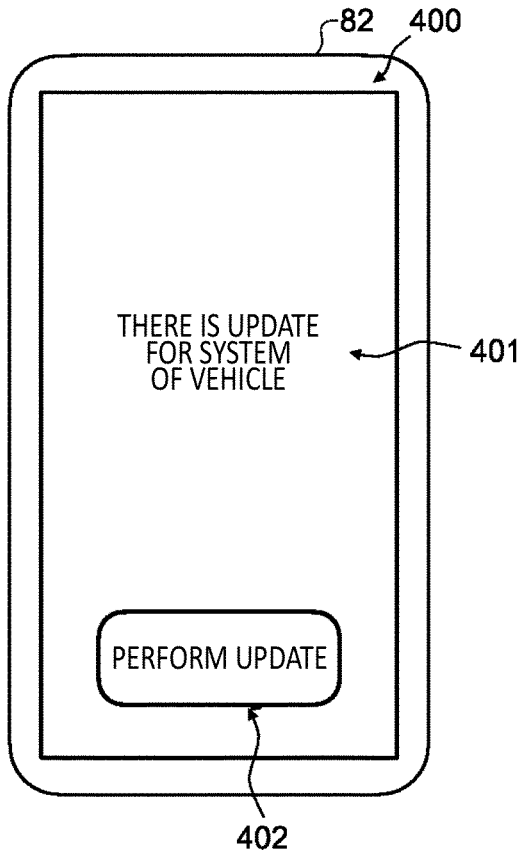
FIG. 3 schematically shows one example of a notification screen 400 on which a first notification is displayed by a mobile terminal 82.

FIG. 3 schematically shows one example of a notification screen 400 on which the first notification is displayed by the mobile terminal 82. The notification screen 400 includes a message 401 indicating that the software update of the control system 200 of the vehicle 20 can be performed, and a button 402 for receiving a response operation from the user 80. Once the user 80 operates the button 402, the mobile terminal 82 transmits response information for instructing execution of the software update to the server 70.

Figure 4:
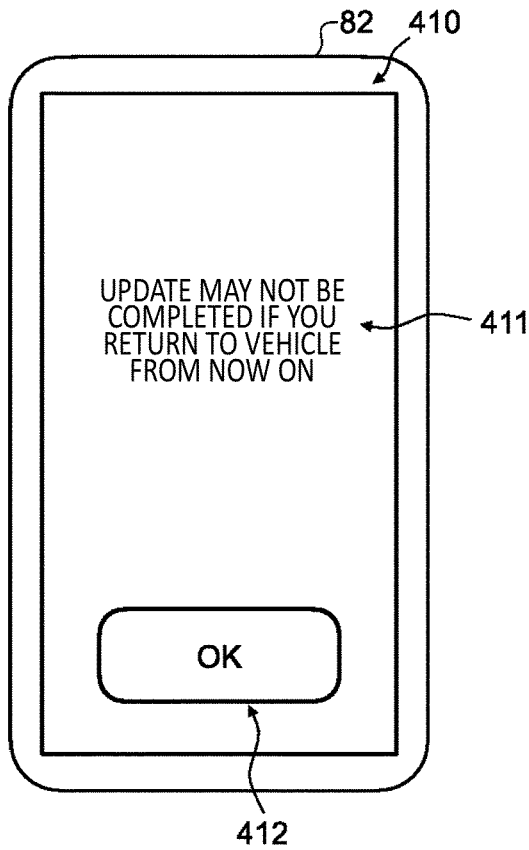
FIG. 4 schematically shows one example of a notification screen 410 on which a second notification is displayed by the mobile terminal 82.

FIG. 4 schematically shows one example of a notification screen 410 on which the second notification is displayed by the mobile terminal 82. The notification screen 410 shows one example of a screen when the terminal-vehicle distance at the time of the notification response is r2 or more and less than r1. The notification screen 410 includes a message 411 indicating that the software update may not be completed if the user 80 returns from a current location to a location of the vehicle 20, and a button 412 for receiving a response operation from the user 80. Once the user 80 operates the button 412, the mobile terminal 82 transmits response information indicating that the notification has been confirmed to the server 70.

Figure 5:
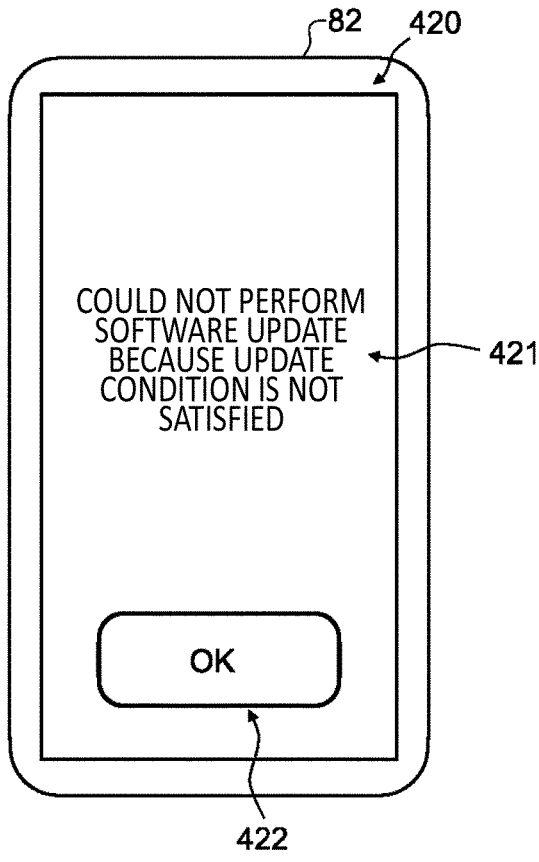
FIG. 5 schematically shows one example of a notification screen 420 on which a second notification is displayed by the mobile terminal 82.

FIG. 5 schematically shows one example of a notification screen 420 on which the second notification is displayed by the mobile terminal 82. The notification screen 420 shows one example of a screen when the terminal-vehicle distance at the time of the notification response is less than r2. The notification screen 420 includes a message 421 indicating that the software update could not be performed, and a button 422 for receiving a response operation from the user 80. Once the user 80 operates the button 412, the mobile terminal 82 transmits response information indicating that the user 80 has approved that the software update could not be performed to the server 70.

Figure 6:
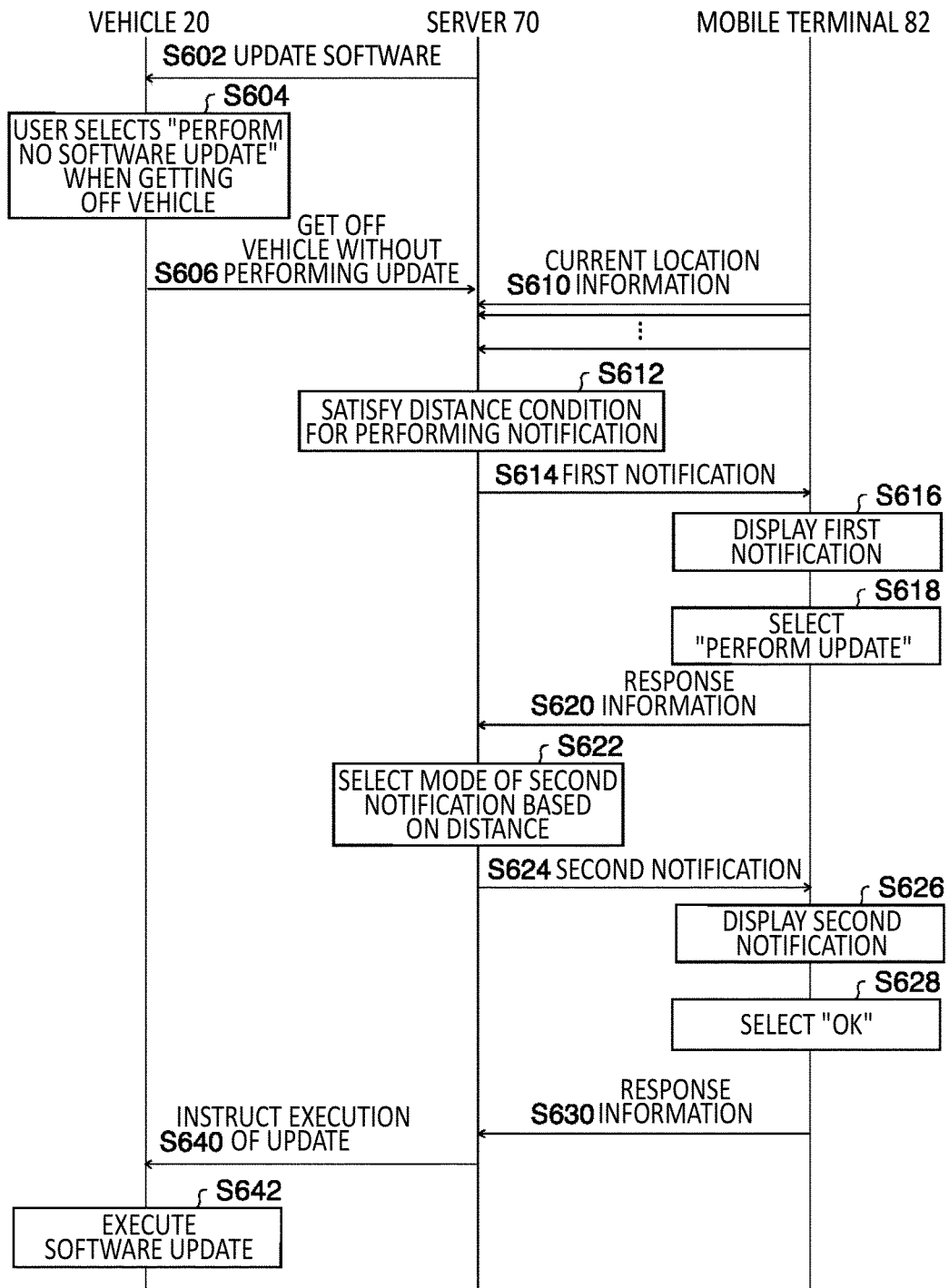
FIG. 6 shows examples of overviews of processing procedures executed by a vehicle 20, the server 70, and the mobile terminal 82.

FIG. 6 shows examples of overviews of processing procedures executed by the vehicle 20, the server 70, and the mobile terminal 82.

In S602, the processing unit 300 of the server 70 transmits, if there is update software for an ECU included in the control system 200, the update software to the control system 200 via the communication apparatus 348. The transmission of the update software to the control system 200 may be performed while the vehicle 20 is travelling.

In S604, the control system 200 receives an instruction indicating that no software update of the control system 200 will be performed when the user 80 gets out of the vehicle 20. For example, the control system 200 presents, when an ignition (IG) power supply of the vehicle 20 is turned off, a confirmation request for performing the software update to the user 80 through an HMI function of the display control system 200. The control system 200 can receive, in response to the confirmation request, an instruction indicating that no software update will be performed from the user 80. In this case, in S606, the control system 200 notifies the server 70 of information representing that the user 80 has gotten off the vehicle 20 without performing the software update, as well as current location information of the vehicle 20.

In S610, the server 70 receives current location information of the mobile terminal 82 which is periodically transmitted from the mobile terminal 82. The distance obtaining unit 310 calculates, based on the location information of the vehicle 20 received in S606 and the current location information received from the mobile terminal 82, a current distance between the mobile terminal 82 and the vehicle 20.

In S612, the controlling unit 330 determines that the distance between the mobile terminal 82 and the vehicle 20 satisfies a predetermined distance condition for performing the first notification. For example, if the distance between the mobile terminal 82 and the vehicle 20 is predetermined distance r1 or more, the controlling unit 330 determines that the predetermined distance condition for performing the first notification is satisfied.

In S614, the controlling unit 330 transmits the first notification to the mobile terminal 82 via the communication apparatus 348. The first notification indicates that software update of the control system 200 is available. In S616, the mobile terminal 82 displays based on the first notification. For example, the mobile terminal 82 displays the notification screen 400 shown in FIG. 3.

Next, after the notification is performed on the mobile terminal 82 in S616, the software update is selected to be performed on the notification screen 400 (S618). In S620, the mobile terminal 82 transmits response information in response to the first notification received in S614 to the server 70. The response information contains current location information of the mobile terminal 82.

In S622, the distance obtaining unit 310 calculates, based on the location information of the vehicle 20 received in S606 and the current location information of the mobile terminal 82 contained in the response information received in S620, a distance between the mobile terminal 82 and the vehicle 20 (i.e., a terminal-vehicle distance at the time of the notification response) for when the user 80 responds to the first notification. Then, the distance obtaining unit 310 determines a mode of the second notification based on the terminal-vehicle distance at the time of the notification response.

Here, it is assumed that the terminal-vehicle distance at the time of the notification response is r2 or more and less than r1. In this case, in S624, the second notification is transmitted to the mobile terminal 82. The second notification may indicate that the software update may not be completed if the user 80 returns to the location of the vehicle 20. In S626, the mobile terminal 82 displays based on the second notification. For example, the mobile terminal 82 displays the notification screen 410 shown in FIG. 4.

Next, after the notification is performed on the mobile terminal 82 in S626, confirmation of the notification is selected on the notification screen 410 (S628). In S630, the mobile terminal 82 transmits response information indicating that the second notification received in S614 has been confirmed to the server 70.

Once the server 70 receives the response information from the mobile terminal 82 in response to the second notification in S640, the controlling unit 330 instructs the control system 200 to execute the software update in S640. In S642, the control system 200 executes the software update for an ECU which is a target of the software update performed by the update software received in S602.

Figure 7:
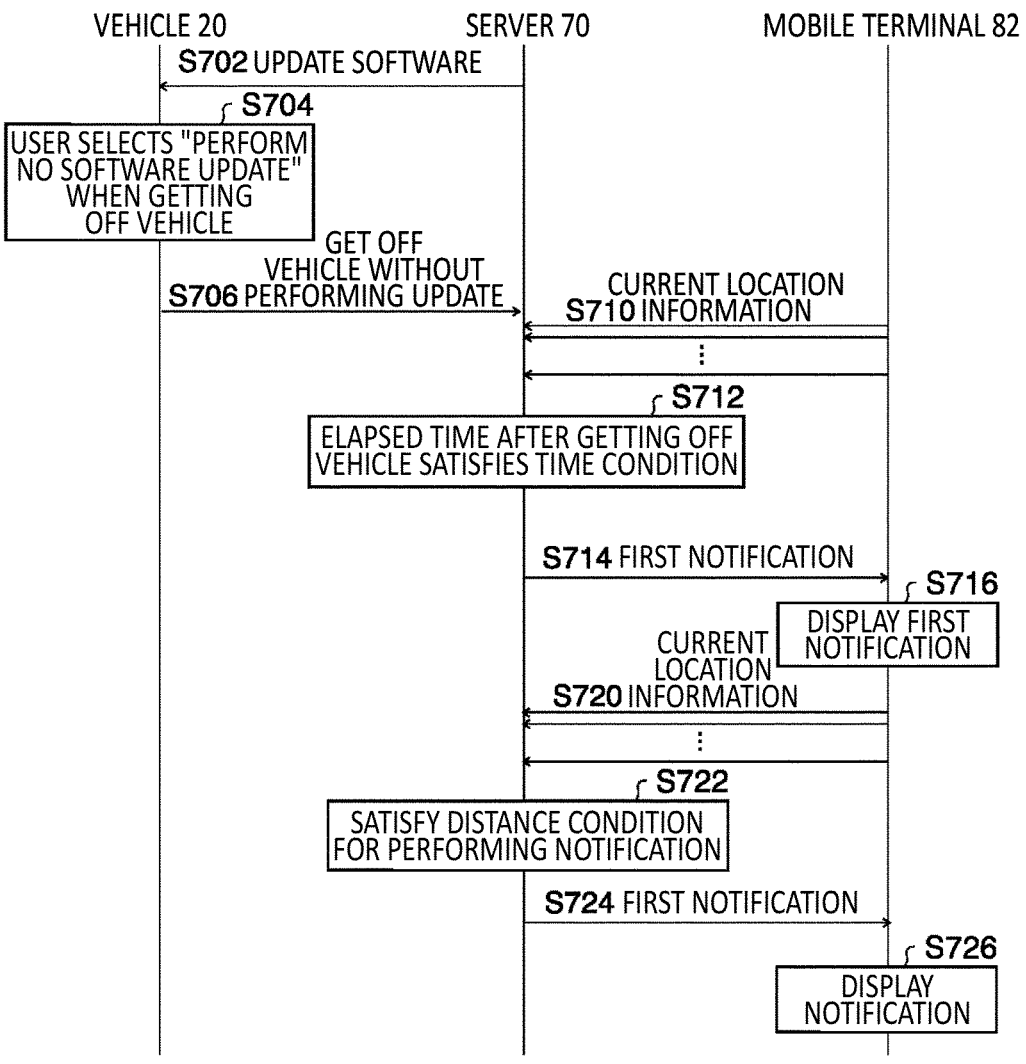
FIG. 7 shows examples of overviews of processing procedures executed by the vehicle 20, the server 70, and the mobile terminal 82.

FIG. 7 shows examples of overviews of processing procedures executed by the vehicle 20, the server 70, and the mobile terminal 82. Processing in S702, S704, S706, and S710 in FIG. 7 is the same as the processing in S602, S604, S606, and S610 in FIG. 6, respectively, and thus description thereof is omitted.

In S712, the elapsed time obtaining unit 320 determines that the elapsed time from when the notification in S706 was received satisfies a predetermined time condition. In this case, the controlling unit 330 transmits a first notification to the mobile terminal 82 via the communication apparatus 348. The first notification is the same as the first notification described in regard to FIGS. 3, 6, or the like. In S716, the mobile terminal 82 displays based on the first notification. For example, the mobile terminal 82 displays the notification screen 400 shown in FIG. 3.

Here, it is assumed that the user 80 did not respond to the first notification. In this case, the mobile terminal 82 periodically transmits, after the displaying in S716, current location information of the mobile terminal 82 in S720. In the server 70, the distance obtaining unit 310 calculates, based on the location information of the vehicle 20 received in S706 and the current location information received from the mobile terminal 82, a current distance between mobile terminal 82 and the vehicle 20.

In S722, the controlling unit 330 determines that the distance between the mobile terminal 82 and the vehicle 20 satisfies a predetermined distance condition for performing the first notification. For example, if the distance between the mobile terminal 82 and the vehicle 20 is predetermined distance r1 or more, the controlling unit 330 determines that the predetermined distance condition for performing the first notification is satisfied.

In S724, the controlling unit 330 transmits the first notification to the mobile terminal 82 via the communication apparatus 348. The first notification indicates that software update of the control system 200 is available, and is the same as the first notification transmitted in S714. Thereby, the mobile terminal 82 displays again based on the first notification in S726. For example, the mobile terminal 82 displays the notification screen 400 shown in FIG. 3 again.

As shown in FIG. 7, the server 70 performs the first notification when the elapsed time after the user 80 gets out of the vehicle 20 has reached a predetermined time, and transmits the first notification again after performing the first notification and when the distance between the mobile terminal 82 and the vehicle 20 becomes the distance r1 or more. Thereby, since the first notification is performed again after performing the first notification in response to a certain time being elapsed and when the user 80 has moved farther away from the vehicle 20 by the distance r1 or more, the user 80 can be encouraged to perform the software update at a timing at which there is a higher possibility that the software update can be completed before the user 80 returns to the vehicle 20.

Figure 8:
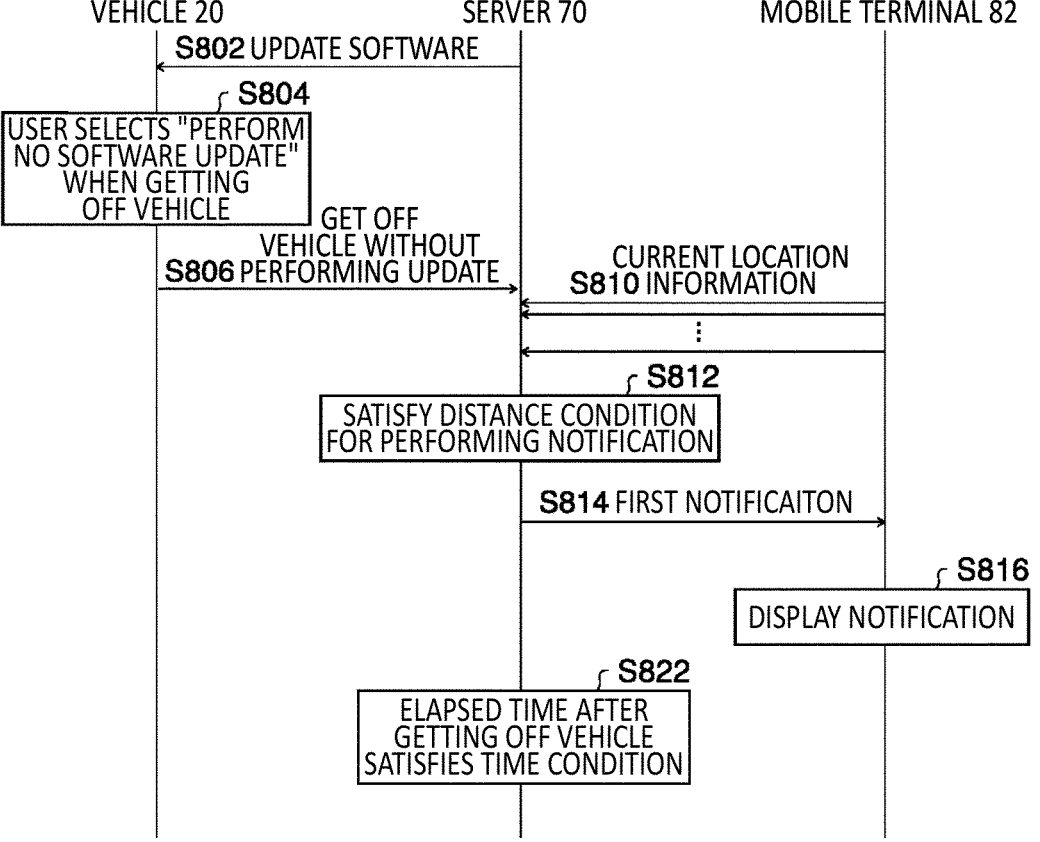
FIG. 8 shows examples of overviews of processing procedures executed by the vehicle 20, the server 70, and the mobile terminal 82.

FIG. 8 shows examples of overviews of processing procedures executed by the vehicle 20, the server 70, and the mobile terminal 82. Processing in S802, S804, S806, S810, S812, S814, and S816 in FIG. 8 is the same as the processing in S602, S604, S606, S610, S612, S614, and S616 in FIG. 6, respectively, and thus description thereof is omitted.

Here, it is assumed that the user 80 did not respond to the first notification in S816. In S822, the elapsed time obtaining unit 320 determines that the elapsed time from when the notification in S806 was received satisfies a predetermined time condition. In this case, the controlling unit 330 does not transmit the first notification even if the elapsed time satisfies the predetermined time condition, because the first notification has already been performed in response to the distance condition being satisfied in S812. Because the first notification has already been performed in response to the distance condition being satisfied in S812, and at a timing at which there is a higher possibility that the software update can be completed before the user 80 returns to the vehicle 20, further performing the first notification in response to the elapsed time being longer may be perceived by the user 80 as a rather troublesome notification. Therefore, as shown in FIG. 8, if the first notification is transmitted in response to the distance condition being satisfied, by not transmitting the first notification even if the time condition regarding the elapsed time is satisfied after that, the user 80 can be less likely to perceive notifications as being troublesome.

As described above, according to the updating system 10 of the present embodiment, it is possible to change the mode of the second notification to the user 80 after notifying the mobile terminal 82, depending on the distance between the mobile terminal 82 and the vehicle 20 when the user 80 responds to the notification. Thereby, it is possible to appropriately notify depending on the distance between the mobile terminal 82 and the vehicle 20 at a point of time at which the user 80 responds to the notification, such as further notifying of a possibility that use of the vehicle 20 will be restricted due to the software update. Accordingly, it is possible to prevent the user 80 from experiencing such a situation in which the software update of the control system 200 is being performed when the user 80 returns to the vehicle 20.

In FIGS. 2, 6, 7, and 8, embodiments in which the notifications are transmitted to the mobile terminal 82 under the control of the processing unit 300 of the server 70 have been described. However, the functions of the processing unit 300 related to correspondence between the server 70 and the mobile terminal 82 may be provided as functions of the mobile terminal 82. By way of example, if the mobile terminal 82 receives notification indicating that the IG power supply of the vehicle 20 has been turned off from the control system 200 of the vehicle 20, the mobile terminal 82 can judge location information of the mobile terminal 82 provided when receiving the notification as location information of the vehicle 20. Thereby, the mobile terminal 82 can independently calculate the distance between vehicle 20 and mobile terminal 82. Also, the mobile terminal 82 can independently calculate, by counting the elapsed time from a timing at which the notification indicating that the IG power supply of the vehicle 20 has been turned off is received, the elapsed time from a point of time at which the user 80 got out of the vehicle 20. Therefore, the mobile terminal 82 can have the functions of the distance obtaining unit 310 and the elapsed time obtaining unit 320. Moreover, it is obvious that the mobile terminal 82 can have a functional part of the controlling unit 330 in which notification is controlled depending on a distance obtained by the distance obtaining unit 310 and elapsed time obtained by the elapsed time obtaining unit 320. Alternatively, it is possible to adopt an embodiment in which the functions of the processing unit 300 of the server 70 are shared between server 70 and the mobile terminal 82.

Note that, the vehicle 20 is one example of transportation equipment. The vehicle may be an automobile including an automobile mounting an internal combustion engine, an electric vehicle, a fuel cell vehicle (FCV), or the like. The automobile includes a bus, a truck, a two-wheeled vehicle, or the like. The vehicle may be a saddle-type vehicle, a motorcycle, or the like. The transportation equipment includes, other than the vehicle, equipment such as an aircraft including an unmanned aerial vehicle, and a ship. The transportation equipment may be any equipment for transporting people or items. The transportation equipment is one example of a mobile object. The mobile object is not limited to the transportation equipment, thus may be any moveable equipment.

Figure 9:
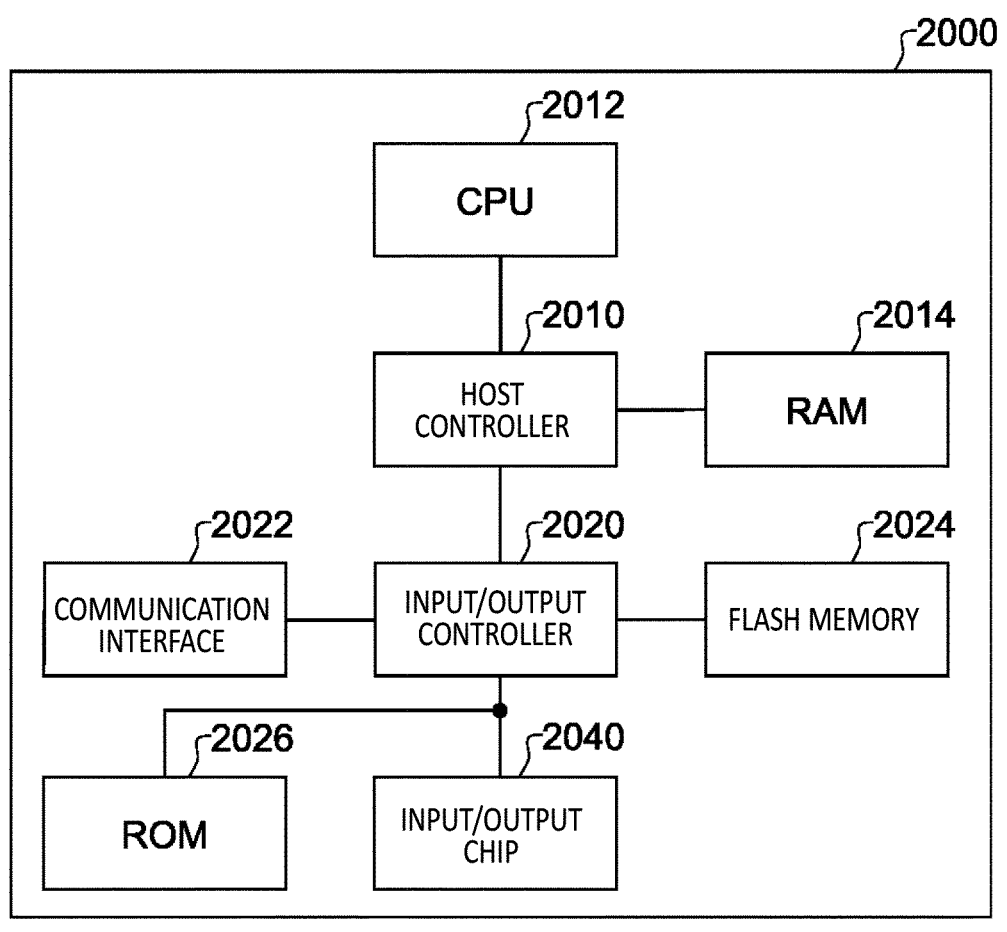
FIG. 9 shows an example of a computer 2000 in which a plurality of embodiments of the present invention may be entirely or partially embodied.

FIG. 9 shows an example of a computer 2000 in which a plurality of embodiments of the present invention may be entirely or partially embodied. A program that is installed in the computer 2000 can cause the computer 2000 to: function as a system such as the control system according to the embodiment or each unit of the system, or an apparatus such as the processing unit 300 or each unit of the apparatus; execute operations associated with the system or the each unit of the system, or the apparatus or the each unit of the apparatus; and/or execute a process or a stage of the process according to the embodiment. Such a program may be executed by a CPU 2012 to cause the computer 2000 to execute particular operations associated with the processing procedures described in the present specification and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with another electronic device via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

The program is provided via a network or a computer-readable storage medium such as a CD-ROM, a DVD-ROM, or a memory card. The RAM 2014, the ROM 2026, or the flash memory 2024 is an example of the computer-readable storage medium. Programs are installed in the flash memory 2024, the RAM 2014, or the ROM 2026 and executed by the CPU 2012. The information processing written in these programs is read by the computer 2000, and thereby cooperation between a program and the above described various types of hardware resources is achieved. An apparatus or method may be constituted by performing the operations or processing of information by using the computer 2000.

For example, if communication is executed between the computer 2000 and an external device, the CPU 2012 may execute a communication program loaded onto the RAM 2014 to instruct communication processing to the communication interface 2022, based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and execute various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may execute various types of processing on the data read from the RAM 2014, which includes various types of operations, information processing, conditional judging, conditional branch, unconditional branch, searching/replacement of information, etc., as described in the present specification and specified by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is specified, from among the plurality of entries, and read the attribute value of the second attribute stored in the entry, thereby obtaining the attribute value of the second attribute associated with the first attribute satisfying the predetermined condition.

The programs or a software module described above may be stored on the computer 2000 or in a computer-readable storage medium near the computer 2000. A recording medium provided in a server system connected to a dedicated communication network or the Internet, such as a hard disk or RAM, can be used as the computer-readable storage medium. The programs stored in the computer-readable storage medium may be provided to the computer 2000 via the network.

The programs installed onto the computer 2000 for causing the computer 2000 to function as the processing unit 300 may instruct the CPU 2012 or the like to cause the computer 2000 to function as each unit of the processing unit 300. The information processing written in these programs is read by the computer 2000, and thereby functions as each unit of the processing unit 300 being a concrete means provided by cooperation of software and the each type of hardware resources described above. With these concrete means, a particular processing unit 300 suitable for an intended use can be formed by performing calculations or processing of information appropriate for the intended use of the computer 2000 of the present embodiment.

Various embodiments have been described by referring to the block diagrams and the like. In the block diagram, each block may represent (1) a stage of a process in which an operation is executed, or (2) each unit of the apparatus having a role of executing the operation. Particular stages and each unit may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include digital and/or analog hardware circuits and may include an integrated circuit (IC) and/or a discrete circuit. The programmable circuit may include a reconfigurable hardware circuit including logical AND, logical OR, logical XOR, logical NAND, logical NOR, and other logical operations, a memory element etc. including a flip-flop, register, field-programmable gate array (FPGA), programmable logic array (PLA), etc.

The computer-readable storage medium may include any tangible device capable of storing an instruction to be executed by an appropriate device, so that the computer-readable storage medium having the instruction stored thereon constitutes at least a part of a product including an instruction that may be executed in order to provide means to execute an operation specified by a processing procedure or a block diagram. An example of the computer-readable storage medium may include an electronic storage medium, a magnetic storage medium, an optical storage medium, an electromagnetic storage medium, a semiconductor storage medium, or the like. A more specific example of the computer-readable storage medium may include a floppy (registered trademark) disk, a diskette, a hard disk, a random-access memory (RAM), a read-only memory (ROM), an erasable programmable read-only memory (EPROM or Flash memory), an electrically erasable programmable read-only memory (EEPROM), a static random-access memory (SRAM), a compact disc read-only memory (CD-ROM), a digital versatile disk (DVD), a BLU-RAY (registered trademark) disc, a memory stick, an integrated circuit card, etc.

The computer-readable instruction may include any of an assembler instruction, instruction-set-architecture (ISA) instruction, machine instruction, machine dependent instruction, microcode, firmware instruction, state-setting data, or either of a source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

The computer-readable instruction may be provided to a processor of a general purpose computer, special purpose computer, or other programmable data processing apparatus, or to programmable circuit, locally or via a local area network (LAN), wide area network (WAN) such as the Internet, etc., to execute the computer-readable instructions to provide means for executing described processing procedure or operations specified in the block diagrams. An example of the processor includes a computer processor, processing unit, microprocessor, digital signal processor, controller, microcontroller, etc.

While the present invention has been described with the embodiments, the technical scope of the present invention is not limited to the scope of the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, stages etc. of each processing performed by an apparatus, system, program, and method shown in the claims, specification, or drawings can be performed in any order as long as the order is not indicated by "prior to," "before," or the like and as long as the output from a previous processing is not used in a later processing. Even if the operation flow is described using phrases such as "first" or "next" in the claims, specification, or drawings, it does not necessarily mean that the process must be performed in this order.

EXPLANATION OF REFERENCES

10: updating system;
20: vehicle;
70: server;
80: user;
82: mobile terminal;
200: control system;
300: processing unit;
310: distance obtaining unit;
320: elapsed time obtaining unit;
330: controlling unit;
348: communication apparatus;
380: storage unit;
400: notification screen;
401: message;
402: button;
410: notification screen;
411: message;
412: button;
420: notification screen;
421: message;
422: button;
2000: computer;
2010: host controller;
2012: CPU;
2014: RAM;
2020: input/output controller;

2022: communication interface;
2024: flash memory;
2026: ROM;
2040: input/output chip.

What is claimed is:

1. A notification control apparatus, comprising:
at least one processor;
a distance obtaining unit for obtaining, using the at least one processor, a distance between a vehicle and a mobile terminal associated with the vehicle; and
a controlling unit for outputting, using the at least one processor, to the mobile terminal, based on the distance obtained by the distance obtaining unit, notification regarding software update of the vehicle,
wherein the controlling unit is further configured to, using the at least one processor:
the distance obtained by the distance obtaining unit is a first distance or more and output to the mobile terminal a first notification for confirming whether to perform the software update with a user; and
change a mode of a second notification regarding the software update for the mobile terminal, based on whether the distance obtained by the distance obtaining unit is the first distance or more when execution of the software update is instructed in response to the first notification,
wherein the distance obtained by the distance obtaining unit is shorter than the first distance and equal to or more than a second distance that is shorter than the first distance when execution of the software update is instructed in response to the first notification and the controlling unit is further configured to output, using the at least one processor, the second notification for the mobile terminal and also perform control for transmitting a signal for instructing the vehicle to perform the software update,
the distance obtained by the distance obtaining unit is shorter than the second distance when execution of the software update is instructed in response to the first notification and the controlling unit is further configured to output, using the at least one processor, the second notification for the mobile terminal, and
wherein the second notification is for indicating the software update.

2. The notification control apparatus according to claim 1, wherein the distance obtained by the distance obtaining unit is shorter than the first distance and equal to or more than the second distance that is shorter than the first distance when execution of the software update is instructed in response to the first notification and the second notification is for indicating that use of the vehicle will be restricted due to the software update.

3. The notification control apparatus according to claim 1, wherein:
the distance obtained by the distance obtaining unit is shorter than the first distance and equal to or more than the second distance that is shorter than the first distance when execution of the software update is instructed in response to the first notification and the second notification is for indicating that use of the vehicle will be restricted due to the software update; and
the distance obtained by the distance obtaining unit is shorter than the second distance when execution of the software update is instructed in response to the first notification and the second notification is for indicating that the software update will not be performed.

4. The notification control apparatus according to claim 1, wherein:

the distance obtained by the distance obtaining unit is shorter than the first distance and equal to or more than the second distance that is shorter than the first distance when execution of the software update is instructed in response to the first notification and the second notification is for indicating that use of the vehicle will be restricted due to the software update; and the distance obtained by the distance obtaining unit is shorter than the second distance when execution of the software update is instructed in response to the first notification and the second notification is for requesting approval for the software update.

5. A notification control apparatus according to claim 1, comprising:

at least one processor;

a distance obtaining unit for obtaining, using the at least one processor, a distance between a vehicle and a mobile terminal associated with the vehicle; and a controlling unit for outputting, using the at least one processor, to the mobile terminal, based on the distance obtained by the distance obtaining unit, notification regarding software update of the vehicle, wherein the controlling unit is further configured to, using the at least one processor:

the distance obtained by the distance obtaining unit is a first distance or more and output to the mobile terminal a first notification for confirming whether to perform the software update with a user; and change a mode of a second notification regarding the software update for the mobile terminal, based on whether the distance obtained by the distance obtaining unit is the first distance or more when execution of the software update is instructed in response to the first notification, and wherein the distance obtained by the distance obtaining unit is the first distance or more when execution of the software update is instructed in response to the first notification and the controlling unit is configured to perform, using the at least one processor, without outputting the second notification for the mobile terminal, control of transmitting a signal for instructing the vehicle to perform the software update.

6. The notification control apparatus according to claim 2, wherein the distance obtained by the distance obtaining unit is the first distance or more when execution of the software update is instructed in response to the first notification and the controlling unit is configured to perform, using the at least one processor, without outputting the second notification for the mobile terminal, control of transmitting a signal for instructing the vehicle to perform the software update.

7. The notification control apparatus according to claim 3, wherein the distance obtained by the distance obtaining unit is the first distance or more when execution of the software update is instructed in response to the first notification and the controlling unit is configured to perform, using the at least one processor, without outputting the second notification for the mobile terminal, control of transmitting a signal for instructing the vehicle to perform the software update.

8. The notification control apparatus according to claim 4, wherein the distance obtained by the distance obtaining unit is the first distance or more when execution of the software update is instructed in response to the first notification and the controlling unit is configured to perform, using the at least one processor, without outputting the second notification for the mobile terminal, control of transmitting a signal for instructing the vehicle to perform the software update.

9. A notification control apparatus, comprising:

at least one processor;

a distance obtaining unit for obtaining, using the at least one processor, a distance between a vehicle and a mobile terminal associated with the vehicle;

an elapsed time obtaining unit for obtaining, using the at least one processor, elapsed time after a user of the vehicle gets out of the vehicle; and a controlling unit for outputting, using the at least one processor, to the mobile terminal, based on the distance obtained by the distance obtaining unit or the elapsed time obtained by the elapsed time obtaining unit, notification regarding software update of the vehicle, wherein the controlling unit is further configured to, using the at least one processor:

the elapsed time obtained by the elapsed time obtaining unit becomes a first time or more and output to the mobile a first notification for confirming whether to perform the software update;

the distance obtained by the distance obtaining unit becomes a first distance or more after outputting the first notification and output the first notification again;

the distance obtained by the distance obtaining unit becomes the first distance or more before the elapsed time obtained by the elapsed time obtaining unit becomes the first time or more and output the first notification; and the elapsed time obtained by the elapsed time obtaining unit becomes the first time or more after outputting the first notification when the distance obtained by the distance obtaining unit becomes the first distance or more before the elapsed time obtained by the elapsed time obtaining unit becomes the first time or more and restrain output of the first notification.

10. A method, comprising:

obtaining a distance between a vehicle and a mobile terminal associated with the vehicle; and outputting to the mobile terminal, based on the distance obtained, notification regarding software update of the vehicle, wherein the outputting notification regarding software update of the vehicle includes:

the distance obtained is a first distance or more and outputting a first notification for confirming whether to perform the software update with a user; and changing a mode of a second notification regarding the software update for the mobile terminal, based on whether the distance obtained is the first distance or more when execution of the software update is instructed in response to the first notification, wherein the distance obtained is shorter than the first distance and equal to or more than a second distance that is shorter than the first distance when execution of the software update is instructed in response to the first notification and the outputting the notification includes outputting the second notification for the mobile terminal and also perform control for transmitting a signal for instructing the vehicle to perform the software update, the distance obtained is shorter than the second distance when execution of the software update is instructed in response to the first notification and the outputting the notification further includes outputting the second notification for the mobile terminal, and wherein the second notification is for indicating the software update.

11. A method, comprising:

obtaining a distance between a vehicle and a mobile terminal associated with the vehicle; and outputting to the mobile terminal, based on the distance obtained, notification regarding software update of the vehicle, wherein the outputting notification regarding software update of the vehicle includes:

the distance obtained is a first distance or more and outputting to the mobile terminal a first notification for confirming whether to perform the software update with a user; and changing a mode of a second notification regarding the software update for the mobile terminal, based on whether the distance obtained is the first distance or more when execution of the software update is instructed in response to the first notification, and wherein the distance obtained is the first distance or more when execution of the software update is instructed in response to the first notification and the outputting the notification further includes performing, without outputting the second notification for the mobile terminal, control of transmitting a signal for instructing the vehicle to perform the software update.

\* \* \* \* \*